(12) United States Patent
Bremer et al.

(10) Patent No.: US 12,157,234 B2
(45) Date of Patent: Dec. 3, 2024

(54) SAFETY TRAJECTORIES FOR ROBOTIC CONTROL SYSTEMS

(71) Applicant: Intrinsic Innovation LLC, Mountain View, CA (US)

(72) Inventors: Benjamin Bremer, Ottobrunn (DE); Torsten Kroeger, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 592 days.

(21) Appl. No.: 17/353,620

(22) Filed: Jun. 21, 2021

(65) Prior Publication Data

US 2022/0402135 A1    Dec. 22, 2022

(51) Int. Cl.
*B25J 9/16* (2006.01)
*G05B 19/4155* (2006.01)

(52) U.S. Cl.
CPC .......... *B25J 9/1676* (2013.01); *B25J 9/1602* (2013.01); *B25J 9/1666* (2013.01); *G05B 19/4155* (2013.01); *G05B 2219/50391* (2013.01)

(58) Field of Classification Search
None
See application file for complete search history.

(56) References Cited

U.S. PATENT DOCUMENTS 8,700,307 B1 *   4/2014   Zhao ..................... B25J 9/1666
                                                             701/301
2011/0184555 A1   7/2011   Kosuge et al.
2016/0016311 A1   1/2016   Konolige et al.
2018/0200887 A1   7/2018   Geissdörfer et al.
(Continued)

FOREIGN PATENT DOCUMENTS

CN        111693050 A  *  9/2020  ........... G01C 21/206
WO    WO 2017/197170     11/2017

OTHER PUBLICATIONS

Edaqa, Why switch is better than if-else. Accessed through https://mortoray.com/why-switch-is-better-than-if-else/ (Year: 2019).*
(Continued)

*Primary Examiner* — Jaime Figueroa
*Assistant Examiner* — Arslan Azhar
(74) *Attorney, Agent, or Firm* — Fish & Richardson P.C.

(57) ABSTRACT

Methods, systems, and apparatus, including computer programs encoded on computer storage media, for generating safety trajectories. One of the methods comprises causing, by a robotic control system, execution of a robotic control plan by a plurality of robotic components in a robotic execution environment; generating a safety trajectory at each of a plurality of time points during the execution of the robotic control plan, including: obtaining data identifying a current position of a particular robotic component of the plurality of robotic components; generating, using the obtained data, a safety trajectory for the particular robotic component; and providing the safety trajectory to an emergency control system; determining that an emergency condition has been met; and in response, transferring control of the particular robotic component from the robotic control system to the emergency control system, comprising causing, by the emergency control system, execution of the safety trajectory by the particular robotic component.

20 Claims, 3 Drawing Sheets

(56) References Cited

U.S. PATENT DOCUMENTS

2019/0015977 A1* 1/2019 Chang .................... B25J 13/089
2020/0290205 A1   9/2020 Hammes et al.
2021/0260770 A1*  8/2021 Vu ......................... B25J 9/1697

OTHER PUBLICATIONS

International Search Report and Written Opinion in International Appln. No. PCT/US2022/033915, dated Oct. 7, 2022, 10 pages.
International Preliminary Report on Patentability International Appln. No. PCT/US2022/033915, dated Jan. 4, 2024, 7 pages.

* cited by examiner

SAFETY TRAJECTORIES FOR ROBOTIC CONTROL SYSTEMS

BACKGROUND

This specification relates to frameworks for software control systems.

A software control system is a software system that controls the actions of physical devices, e.g., actuators or robots. Some software control systems are real-time software control systems that control real-time systems. A real-time software control system must execute its control routines within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, an execution environment of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state, e.g., by performing a "hard stop" to immediately halt its operation.

Due to such timing requirements, software control systems for physical machines are often implemented by closed software modules that are configured specifically for a highly-specialized tasks. For example, a robot that picks components for placement on a printed circuit board can be controlled by a closed software system that controls each of the low-level picking and placing actions. Often, the coordination of such software control modules follows an observe, plan, and act pattern that involves making a sensor observation, generating a plan, and then acting according to the plan.

SUMMARY

This specification describes a system that can repeatedly generate new safety trajectories for a robotic component during operation of the robotic component. In this specification, a safety trajectory of a robotic component is data representing a motion of the robotic component that, if executed in an emergency situation, causes the robotic component to assume a safe state, e.g., to safely stop its motion. In this specification, an emergency situation in an execution environment of a robotic component is any event that causes the execution environment to enter an unsafe or unexpected state. An emergency situation can require immediate action by a control system of the robotic component, where the immediate action is different from a predetermined task being performed by the robotic component. For example, one or more components of a robotic control system configured to control the robotic component can go offline or otherwise fail.

The system can repeatedly generate, in real time, new safety trajectories for the robotic component in response to the current state of the execution environment. Then, when an emergency situation occurs, the system can automatically switch control of the robotic component from a robotic control system that controls the robotic component under normal conditions to an emergency control system. The emergency control system can then drive the movements of the robotic component to execute the most recent safety trajectory.

Particular embodiments of the subject matter described in this specification can be implemented so as to realize one or more of the following advantages. In some existing systems, when executing a robotic control plan, a robotic component automatically executes a sudden stop or a predetermined linear safety trajectory in response to an emergency situation. For example, the predetermined linear safety trajectory may have been generated before the beginning of the execution of the robotic control plan, e.g., days, months, or years before the execution of the robotic control plan. However, in many situations such a policy is suboptimal, and may even be unsafe. For example, a linear safety trajectory can cause an unsafe situation when another object is in the linear path of the robotic component. As another example, coming to a sudden stop can create an unsafe situation if the robotic component is currently in an unsafe pose or area in the execution environment. Using techniques described in this specification, a system can adaptively generate safety trajectories in response to the current state of the execution environment, allowing the system to ensure safe control of the execution environment in a significantly wider range of possible situations. For example, the system can use recent sensor data captured from the execution environment (e.g., live sensor data or sensor data captured just before the emergency situation) to generate the safety trajectories.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
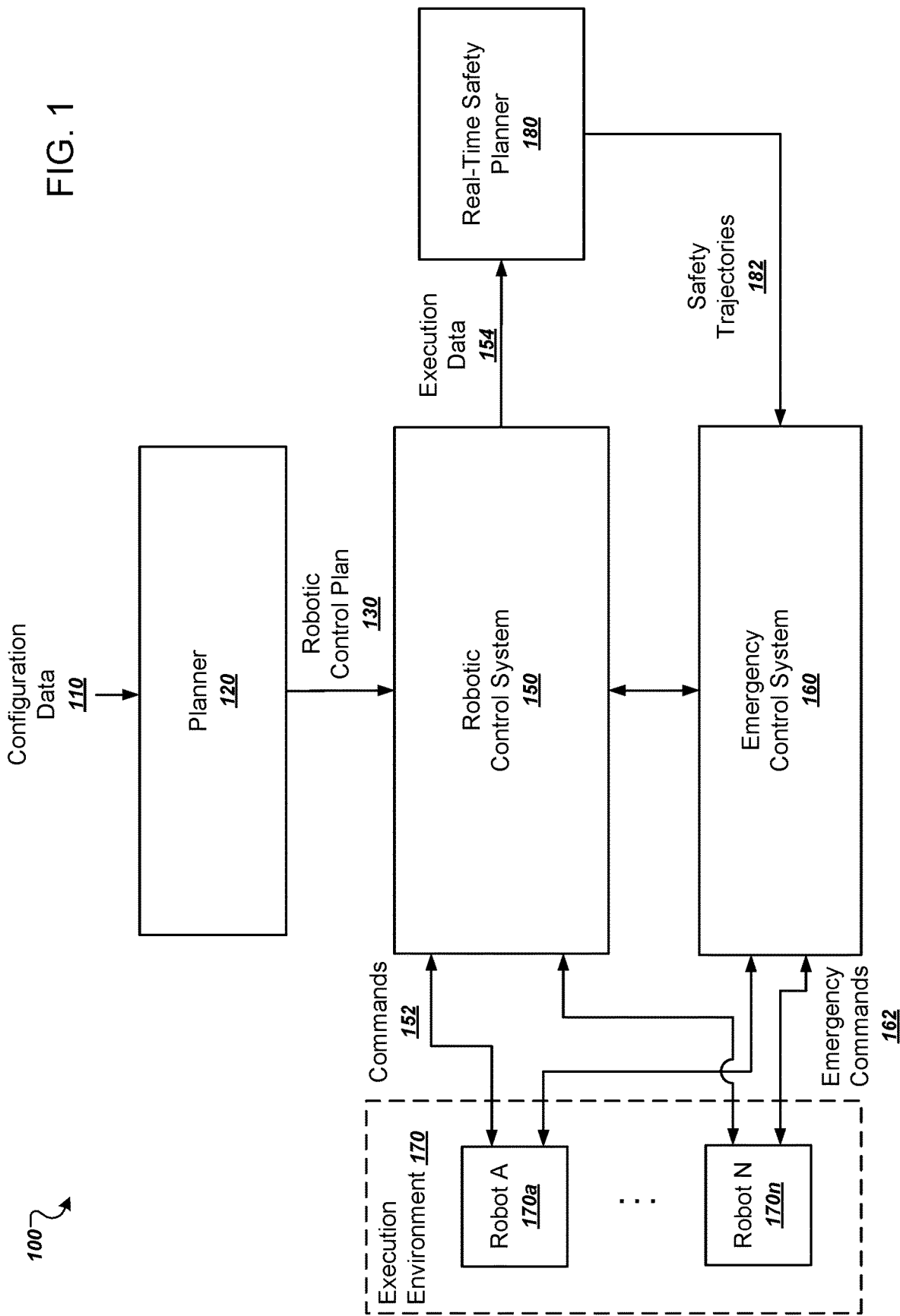
FIG. 1 is a diagram that illustrates an example system.

FIG. 1 is a diagram that illustrates an example system 100. The system 100 is an example of a system that can implement the techniques described in this specification.

The system 100 includes a number of functional components, including a planner 120, a robotic control system 150, a real-time safety planner 180, and an emergency control system 160. Each of these components can be implemented as computer programs installed on one or more computers in one or more locations that are coupled to each other through any appropriate communications network, e.g., an intranet or the Internet, or combination of networks. The system 100 also includes an execution environment 170 that includes N robotic components 170*a-n*, N≥1.

The robotic control system 150 is configured to control the robotic components 170*a-n* in the execution environment 170 to execute a task. In some implementations, the robotic control system 150 is a real-time robotic control system. That is, the robotic control system 150 must satisfy one or more "hard" time constraints in the operation of the execution environment 170. For example, one of the robots in the execution environment 170 may be required to perform a certain operation at regular intervals, e.g. 10 milliseconds; if the robot ever fails to execute the operation in a given time window, then the robot enters a fault state. In some other implementations, the robotic control system 150 must only satisfy "soft" time constraints, where a missed operation does not always necessitate the robot to enter a fault state.

The overall goal of the planner 120 is to generate a robotic control plan 130 that allows the robotic control system 150 to control the robotic components 170a-n in the execution environment 170 in order to execute the required task.

The planner 120 can be configured to generate the robotic control plan 130 using configuration data 110 that identifies the task to be completed by the robotic components 170a-n. The configuration data 110 can have any appropriate format, and can define any parameter of the task execution. In some implementations, the configuration data 110 can leave some or all of the parameters of the task execution undefined, giving the planner 120 more flexibility when generating the robotic control plan 130. The configuration data 110 can be provided by a user of the system 100.

The planner 120 can provide the robotic control plan 130 to the robotic control system 150, which executes the robotic control plan 130 by issuing commands 152 to the execution environment 170 in order to drive the movements of the robotic components 170a-n.

The real-time safety planner 180 is configured to generate, for each of one or more of the robotic components 170a-n, a safety trajectory 182 that the robotic component 170a-n will execute if an emergency situation arises in the execution environment 170. The safety trajectory of a particular robotic component 170a-n at a particular time point in the execution of the robotic control plan 130 represents a movement that the particular robotic component 170a-n can execute at the particular time point in order to ensure a safe environment within the execution environment 170, e.g., in order to avoid a collision with the other robotic components 170a-n or with other objects within the execution environment 170.

Typically, a safety trajectory 182 of a robotic component brings the robotic component to a stop while ensuring the avoidance of any obstacles. A goal of the real-time safety planner 180 can be to bring the robotic components 170a-n to a stop in the shortest amount of time feasible. In some cases, a safety trajectory 182 of a robotic component that is currently stationary in the execution environment can require the robotic component to initiate a movement, e.g., to move out of the way of another robotic component in the execution environment 170. In some cases, a safety trajectory 182 of a robotic component has other requirements, e.g., to continue exerting pressure on another object in the execution environment 170 in cases where such pressure is required to ensure the safety of the execution environment 170.

In particular, during the execution of the task by the robotic components 170a-n in the execution environment 170, the real-time safety planner 180 can continuously generate new safety trajectories 182 and provide the safety trajectories 182 to the emergency control system 160. For example, for each robotic component 170a-n, the real-time safety planner 180 can generate a new safety trajectory 182 for the robotic component 170a-n at regular intervals during the execution, e.g., every millisecond, every 10 milliseconds, or every 100 milliseconds. The frequency with which the real-time safety planner 180 generates new safety trajectories 182 can be a hyperparameter of the system 100, and can be selected by a user of the system 100. The advantages and disadvantages of higher and lower frequencies are discussed below with reference to FIG. 2.

In some implementations, the real-time safety planner 180 is a component of an online motion planner for the robotic control system 150. That is, the real-time safety planner 180 can, in parallel, i) generate the safety trajectories 182 and ii) generate trajectories for the robotic components 170a-n for executing the robotic control plan 130 using the execution data 154. The real-time safety planner 180 can then provide the safety trajectories 182 to the robotic control system 150 and the standard trajectories to the robotic control system 150 in parallel.

To generate the safety trajectories 182, the real-time safety planner 180 can use execution data 154 provided by the robotic control system 150 that characterizes the execution of the robotic control plan 130 in the execution environment 170. For example, the execution data 154 can include data identifying the current position of each of the robotic components 170a-n and/or data identifying current motion parameters for each of the robotic components 170a-n, e.g., a current velocity, acceleration, and so on. Instead or in addition, the execution data 154 can include data characterizing a current status of the task being executed in the execution environment 170. Instead or in addition, the execution data 153 can include data identifying current values for respective parameters of the robotic components 170a-n, e.g., a current payload of a particular robotic component. The execution data 154 can include, or be generated from, logs generated by the robotic control system 150. Instead or in addition, the execution data 154 can include, or be generated from, sensor data captured by one or more sensors operating in the execution environment 170.

A component of the system 100 (e.g., a component of the robotic control system 150 or the emergency control system 160) can continuously monitor the execution of the robotic control plan 130 in the execution environment 170 to determine whether one or more emergency conditions have been satisfied. In this specification, an emergency condition is any condition that requires the execution of the robotic control plan 130 to be stopped; example conditions are discussed in more detail below.

When an emergency condition is satisfied, the robotic control system 150 can cede control of the execution environment 170 to the emergency control system 160. The robotic control system 150 can switch control of the execution environment 170 almost instantaneously, e.g., in less than a millisecond. For example (e.g., in implementations in which the robotic control system 150 monitors the emergency conditions), the robotic control system 150 can send a message to the emergency control system 160 to "wake up" the emergency control system 160. As another example (e.g., in implementations in which the emergency control system 160 monitors the emergency conditions), the emergency control system 160 can send a message to the robotic control system 150 alerting the robotic control system 150 that control of the execution environment 170 is to be switched to the emergency control system 160. As another example, the system 100 can be a multi-master system, i.e., where both the robotic control system 150 and the emergency control system 160 are master nodes. The robotic control system 150 can be the primary master, i.e., the master node during normal operation of the system 100. However, in the event of a failure in the primary master, the emergency control system 160 can be a secondary master that can immediately take control of the execution environment 170 without losing any cycles of the robotic components 170a-n.

In response, the emergency control system 160 can cause the robotic components 170a-n to execute the most recent safety trajectories 182 received from the real-time safety planner 180. In particular, the emergency control system 160 can send emergency commands 162 to the robotic components 170a-n in order to drive the movements of the robotic components 170a-n to execute the respective safety trajectories 182.

The emergency control system 160 can be triggered in response to any appropriate emergency conditions being satisfied. For example, the emergency control system 160 may be triggered if there is a failure in one or more components of the robotic control system 150, e.g., if there is a failure at one or more control levels of the robotic control system 150. Control levels of a robotic control system are discussed in more detail below. As another example, the emergency control system 160 may be triggered if there is a failure in one or more sensors operating in the execution environment 170. As another example, the emergency control system 160 may be triggered if a human being is detected within the execution environment 170. As another example, the emergency control system 160 may be triggered if there is physical damage to an object in the execution environment 170.

As a particular example, a vision system of the execution environment 170, e.g., a vision system that includes one or more LIDAR sensors and/or one or more cameras, may fail. In this event, the robotic control system 150 may no longer have enough information about the current state of the execution environment 170 to ensure safe movement of the robotic components 170a-n. For example, the robotic control system 150 may have been relying on the sensor data captured by the failed sensors to do online motion planning; e.g., the sensor data may have been tracking the location of one or more objects in the execution environment 170 for the purpose of collision avoidance. Therefore, when the robotic control system 150 cedes control of the execution environment 170, the emergency control system 160 can immediately execute the latest safety trajectories 182 to stop the movement of the robotic components 170a-n, e.g., to avoid crossing paths with the tracked objects in the execution environment 170.

In other words, the real-time safety planner 180 can use sensor data captured in the execution environment 170 to generate safety trajectories 182 that are robust even to sensor failure. For example, the real-time safety planner 180 can generate safety trajectories 182 for the robotic components 170a-n so that the robotic components 170a-n avoid the last known position of each of the tracked objects in the execution environment 170. As another example, the real-time safety planner 180 can predict, based on the last known position and the last known motion of the tracked objects, current positions of each of the tracked objects (e.g., by assuming that the velocity or acceleration of the tracked objects has remained constant), and generate safety trajectories 182 for the robotic components 170a-n so that the robotic components 170a-n avoid the predicted current position of each of the tracked objects. The emergency control system 160 can then execute the safety trajectories 182, again even if the sensors have failed and the emergency control system 160 does not have access to data representing the current state of the execution environment 170.

As another particular example, the emergency control system 160 may be triggered if the robotic control system 150 fails to satisfy one or more hard time constraints in the operation of the workcell 170. That is, the robotic control system 150 may be a real-time system that must satisfy hard time constraints at each of a sequence of cycles. For example, one of the robotic components 170a-n in the execution environment 170 may be required to perform a certain operation at regular intervals, e.g. 10 milliseconds. If the robotic component 170a-n ever fails to execute the operation in a given time window, then the robotic component can enter a fault state and the emergency control system 160 can be triggered.

In some implementations, the real-time safety planner 180 uses a behavior tree to generate the safety trajectories 182 for a particular robotic component 170a-n. The behavior tree can define, for any state of the execution environment 170 represented by the execution data 154, a corresponding appropriate safety trajectory 182. In some other implementations, the real-time safety planner 180 can generate the safety trajectories 182 for a particular robotic component 170a-n using a switch statement that includes one or more switches according to the current state of the execution environment 170 represented by the execution data 154. For example, the behavior tree or switch statement can include conditions related to one or more of: a grasping state of a robotic component 170a-n, a current inertia of a robotic component 170a-n, a measure of how close a robotic component 170a-n is to the joint limits of the robotic component 170a-n.

The procedure by which the real-time safety planner 180 generates the safety trajectories, e.g., the behavior tree or switch statement described above, can be determined by a user of the system 100, e.g., an application engineer who provides the configuration data 110 for generating the robotic control plan 130. In some other implementations, the procedure for generating safety trajectories 182 can be automatically generated by the real-time safety planner 180 using a semantic understanding of the execution environment 170 and the robotic control plan 130.

In some implementations, the safety trajectories 182 for a particular robotic component 170a-n are represented using a sequence of waypoints, where each waypoint is a data object that represents a position of the particular robotic component 170a-n at a respective time point. In these implementations, the emergency control system 160 can interpolate between the waypoints in the sequence of waypoints to determine the exact path that the particular robotic component 170a-n must take to execute the safety trajectory 182.

In some implementations, the safety trajectories 182 for a particular robotic component 170a-n are represented using an algebraic function representing the position of the particular robotic component 170a-n across time. For example the safety trajectories 182 can be represented by a spline, e.g., a polynomial or piecewise polynomial spline. Representing a safety trajectory 182 algebraically instead of using a sequence of waypoints can require less memory. This improved memory efficiency can be important in implementations in which the emergency control system 160 is resource-constrained. For example, in some implementations the emergency control system 160 has very little available memory, e.g., 100, 200, or 500 bytes.

The emergency control system 160 can be separated from the robotic control system 150 to ensure that a failure in the robotic control system 150 does not also affect the emergency control system 160. For example, the emergency control system 160 can be hosted on different hardware than the robotic control system 150, so that if the robotic control system 150 experiences a hardware failure, then the emergency control system 160 can still take control of the execution environment 170. As another example, the emergency control system 160 can be executed using a safety-certified operating system and/or be communicatively connected to the robotic control system 150 using a safety-certified bus. In some implementations, isolating the emergency control system 160 from the robotic control system 150 allows the emergency control system 160 to be safety certified while obviating the need to certify the entire software stack of the robotic control system 150, which in some implementations is costly or infeasible. For example, the emergency control system 160 may be required to be certified to a particular safety standard, e.g., a particular safety integrity level (SIL).

As is described in more detail below, a robotic control system, e.g., the robotic control system 150, can include a stack of controllers corresponding to different levels of abstraction in operating the robotic components 170a-n to execute of the robotic control plan 130. In some implementations, the emergency control system 160 can be implemented at any appropriate level in the stack of controllers. In some other implementations, the emergency control system 160 can be entirely independent of the stack of controllers.

When the emergency control system 160 is activated, the emergency control system 160 can operate under the assumption that it is entirely cut off from the robotic control system 150 and must therefore operate without any communication with outside components. For example, given that the emergency control system 160 is implemented at a particular layer of the stack of controllers, the emergency control system 160 can operate under the assumption that every higher-level layer in the stack is unavailable. As a particular example, if the emergency control system 160 is implemented at the level of a motor feedback controller, then the emergency control system 160 can assume that a higher-level joint controller or task-based controller are offline. Thus, the emergency control system 160 can drive the robotic components 170 to execute the safety trajectories 182 without requiring any other input.

In some implementations, the emergency control system 160 is a real-time system that must satisfy one or more hard time constraints in the control of the robotic components 170a-n. For example, a robotic component 170a-n may be required to execute a particular movement or provide a particular data packet to the emergency control system 160 at each of a sequence of cycles, e.g., cycles of 1, 10, 100, or 1000 milliseconds. That is, the emergency control system 160 may operate on a real-time control cycle.

Figure 2:
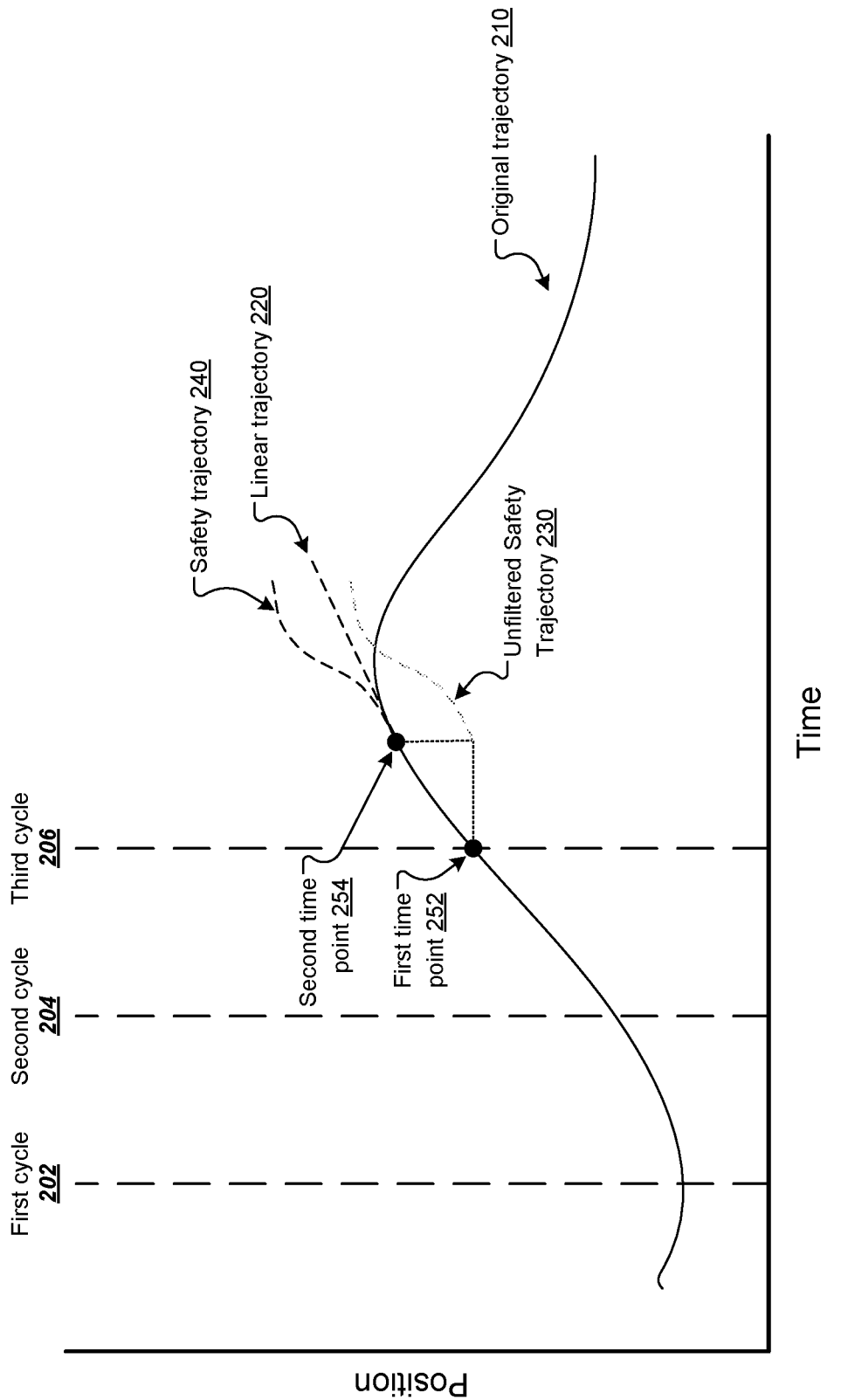
FIG. 2 illustrates an example safety trajectory for a robotic component operating in a robotic execution environment.

FIG. 2 illustrates an example safety trajectory 240 for a robotic component operating in a robotic execution environment.

The safety trajectory 240 for the robotic component can be generated by a real-time safety planner, e.g., the real-time safety planner 180 depicted in FIG. 1, and provided to an emergency control system, e.g., the emergency control system 160 depicted in FIG. 1. In an emergency situation in the execution environment, the emergency control system can take control of the robotic component and execute the safety trajectory 240.

The graph illustrated in FIG. 2 is a simplified example where the robotic component moves in one dimension (identified by the "position" axis) over time (identified by the "time" axis). For example, the robotic component may operate by moving along a one-dimensional rail. Generally, a safety trajectory generated for a robotic component can define a motion in one, two, or three spatial dimensions.

The robotic component is configured to execute an original trajectory 210 defined by a robotic control plan. That is, if there were no emergency in the execution environment, then the robotic component would complete the entire original trajectory 210 during the execution of the robotic control plan.

The real-time safety planner can generate a new safety trajectory 240 at each of a sequence of cycles 202-206. The cycles 202-206 can be regularly spaced, i.e., occur at regular time intervals. For example, the cycles 202-206 can occur every 1, 10, 100, or 1000 milliseconds. If an emergency situation occurs in the execution environment, the emergency control system can execute the most recent safety trajectory for the robotic component.

In the example illustrated in FIG. 2, the safety trajectory 240 has been generated by the real-time safety planner at a first time point 252 corresponding to the third cycle 206. Then, at a second time point 254 that occurs before a fourth cycle of the real-time safety planner, an emergency situation occurs in the execution environment, causing the emergency control system to take control of the robotic component and execute the safety trajectory 240.

As described above, the real-time safety planner generates the safety trajectory 240 in order to ensure that the robotic component does not collide with any other objects in the execution environment. For example, the real-time safety planner can use live sensor data captured in the execution environment to generate the safety trajectory 240.

Some existing systems automatically cause robotic components to execute linear trajectories to bring the robotic components to a stop when a failure occurs. For example, the existing systems may cause the robotic component to execute the linear trajectory 220 starting at the second time point 254. However, the linear trajectory 220 may be suboptimal; as a particular example, the linear trajectory 220 may cause the robotic component to collide with another object in the execution environment. By generating the safety trajectories 240 in real-time and in response to the current state of the execution environment, the real-time safety planner can ensure that the safety trajectories 240.

In some implementations, the emergency control system processes the safety trajectory generated by the real-time safety planner to account for the movement of the robotic component between the first time point 252 and the second time point 254. That is, the real-time safety planner can generate an unfiltered safety trajectory 230 that, if executed at the first time point 252, would cause the safe stopping of the robotic component. Then, at the second time point, the emergency control system can process the unfiltered safety trajectory 230 to generate the final safety trajectory 240 that, when executed at the second time point 254, causes the safe stopping of the robotic component.

Because the robotic component may be in a different position and/or have a different velocity at the first time point 252 (when the unfiltered safety trajectory 230 is generated) compared to the second time point 254, executing the unfiltered safety trajectory 230 at the second time point 254 can cause the motion of the robotic component to be discontinuous, potentially causing vibrations or oscillations in the robotic component that causes damage to the robotic component. Thus, the emergency control system can process the unfiltered safety trajectory 230 to generate the final safety trajectory 240 that will cause the robotic component to experience smooth, continuous motion. As a particular example, the emergency control system can process the unfiltered safety trajectory using a linear filter, e.g., a Bessel filter or another low-pass filter.

In some other implementations, processing safety trajectories generated by the real-time safety planner is not necessary because the cycles 202-206 are frequent enough (e.g., every millisecond or every few milliseconds) that the safety trajectories do not require updating. That is, if the safety trajectories are execute close enough to the time point at which they were generated (i.e., if the frequency at which the safety trajectories are generated is high enough), then the safety trajectories can be safely executed without causing discontinuous motion, because the robotic component has not had the opportunity to change its position or velocity by any significant margin. Thus, the frequency of the cycles 202-206 can be a hyperparameter of the system; a lower frequency requires fewer resources to be committed to generating safety trajectories, but those safety trajectories must be processed using a filter, while a higher frequencies requires more resources to be committed to generating the safety trajectories, but those safety trajectories do not require processing.

Figure 3:
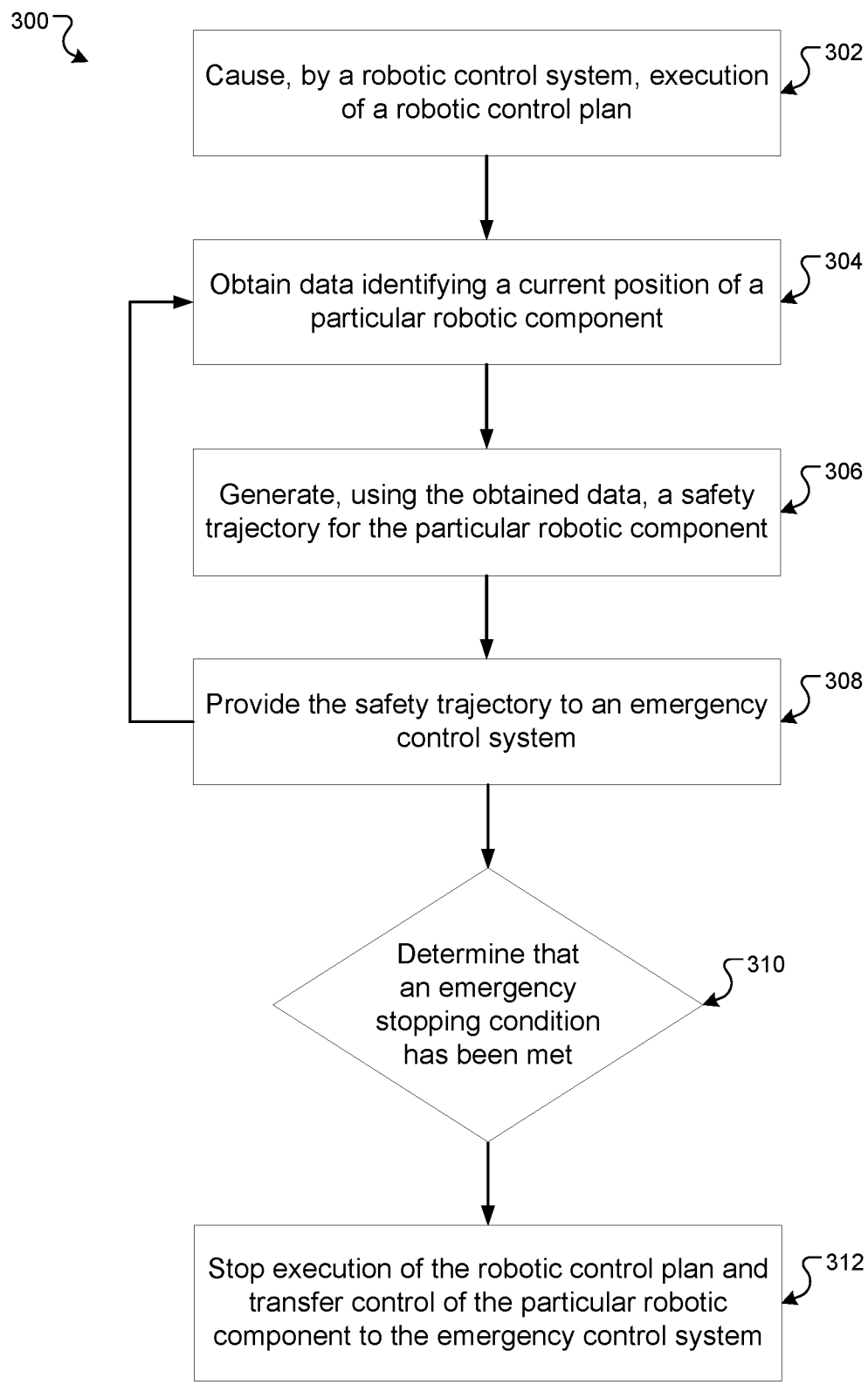
FIG. 3 is a flowchart of an example process for generating and executing a safety trajectory for a robotic component in an execution environment.

FIG. 3 is a flowchart of an example process 300 for generating and executing a safety trajectory for a robotic component in an execution environment. The process 300 can be implemented by one or more computer programs installed on one or more computers and programmed in accordance with this specification. For convenience, the process 300 will be described as being performed by a system of one or more computers. The system includes a robotic control system and an emergency control system. For example, the process 300 can be performed by the system 100 depicted in FIG. 1.

The system causes, by the robotic control system, the execution of a robotic control plan by multiple robotic components operating in a robotic execution environment (step 302).

The system can repeat steps 304-308 at multiple different time points during the execution of the robotic control plan. For example, the system can repeat steps 304-308 cyclically, i.e., at regular intervals.

The system obtains data identifying a current position of a particular robotic component of the multiple robotic components operating in the robotic execution environment (step 304).

The system generates, using the obtained data, a safety trajectory for the particular robotic component (step 306). The safety trajectory can include one or more of: a sequence of waypoint data objects that each represent a pose of the particular robotic component at a different respective time point; or a spline representing motion of the particular robotic component in the robotic execution environment across time. The system can use a behavior tree and/or a switch statement to generate the safety trajectory.

The system provides the safety trajectory to the emergency control system (step 306).

The system determines that an emergency condition has been met (step 310). In response, the system can stop repeating steps 304-308 and continue to step 312.

In response to determining that the emergency condition has been met, the system stops execution of the robotic control plan and transfers control of the particular robotic component from the robotic control system to the emergency control system (step 312). The emergency control system causes execution of the safety trajectory by the particular robotic component.

In some implementations, before causing execution of the safety trajectory, the system processes the safety trajectory using a linear filter, e.g., a Bessel filter, to generate an updated safety trajectory. The emergency control system can then cause execution of the updated safety trajectory.

During execution of the safety trajectory by the particular robotic component, the emergency control system and the robotic control system can be communicatively disconnected, i.e., isolated from each other.

The robot functionalities described in this specification can be implemented by robotic control system (e.g., the robotic control system 150 depicted in FIG. 1) that includes a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to as motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include one or more task-based controllers, e.g., Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
causing, by a robotic control system, execution of a robotic control plan by a plurality of robotic components in a robotic execution environment;
generating a safety trajectory at each of a plurality of time points during the execution of the robotic control plan, including:
obtaining data identifying a current position of a particular robotic component of the plurality of robotic components;
generating, using the obtained data, a safety trajectory for the particular robotic component; and
providing the safety trajectory to an emergency control system;
determining that an emergency condition has been met; and
in response, transferring control of the particular robotic component from the robotic control system to the emergency control system, comprising causing, by the emergency control system, execution of the safety trajectory by the particular robotic component.

Embodiment 2 is the method of embodiment 1, wherein causing, by the emergency control system, execution of the safety trajectory comprises:
processing the safety trajectory using a linear filter to generate an updated safety trajectory; and
causing, by the emergency control system, execution of the updated safety trajectory.

Embodiment 3 is the method of any one of embodiments 1 or 2, wherein the safety trajectory comprises one or more of:
a sequence of waypoint data objects that each represent a pose of the particular robotic component at a different respective time point; or
a spline representing motion of the particular robotic component in the robotic execution environment across time.

Embodiment 4 is the method of any one of embodiments 1-3, wherein a new safety trajectory is generated for the particular robotic component at regular intervals.

Embodiment 5 is the method of any one of embodiments 1-4, wherein, during execution of the safety trajectory by the particular robotic component, the emergency control system and the robotic control system are communicatively disconnected.

Embodiment 6 is the method of any one of embodiments 1-5, wherein generating the safety trajectory for the particular robotic component comprises processing the obtained data using one or more of:
a behavior tree, or
a switch statement.

Embodiment 7 is the method of any one of embodiments 1-6, wherein:
the safety trajectory represents nonlinear movement of the particular robotic component; and linear movement executed by the particular robotic component after the emergency condition would cause a collision in the robotic execution environment.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is one or more non-transitory computer storage media encoded with a computer program, the program comprising instructions that are operable, when executed by data processing apparatus, to cause the data processing apparatus to perform the method of any one of embodiments 1 to 7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
causing, by a robotic control system, execution of a robotic control plan by a plurality of robotic components in a robotic execution environment;
generating a safety trajectory at each of a plurality of time points while executing an original trajectory of the robotic control plan, including:
obtaining data identifying a current position of a particular robotic component of the plurality of robotic components,
generating, using the obtained data, a safety trajectory for the particular robotic component, and providing the safety trajectory to an emergency control system;
determining that an emergency condition has occurred; and
in response, transferring control of the particular robotic component from the robotic control system to the emergency control system, comprising halting execution of the original trajectory and causing, by the emergency control system, execution of the safety trajectory generated before the emergency condition occurred.

2. The method of claim 1, wherein causing, by the emergency control system, execution of the safety trajectory comprises:
processing the safety trajectory using a linear filter to generate an updated safety trajectory; and
causing, by the emergency control system, execution of the updated safety trajectory.

3. The method of claim 1, wherein the safety trajectory comprises one or more of:
a sequence of waypoint data objects that each represent a pose of the particular robotic component at a different respective time point; or
a spline representing motion of the particular robotic component in the robotic execution environment across time.

4. The method of claim 1, wherein a new safety trajectory is generated for the particular robotic component at regular intervals.

5. The method of claim 1, wherein, during execution of the safety trajectory by the particular robotic component, the emergency control system and the robotic control system are communicatively disconnected.

6. The method of claim 1, wherein generating the safety trajectory for the particular robotic component comprises processing the obtained data using one or more of:
a behavior tree, or
a switch statement.

7. The method of claim 1, wherein:
the safety trajectory represents nonlinear movement of the particular robotic component; and
linear movement executed by the particular robotic component after the emergency condition would cause a collision in the robotic execution environment.

8. A system comprising one or more computers and one or more storage devices storing instructions that are operable, when executed by the one or more computers, to cause the one or more computers to perform operations comprising:
causing, by a robotic control system, execution of a robotic control plan by a plurality of robotic components in a robotic execution environment;
generating a safety trajectory at each of a plurality of time points while executing an original trajectory of the robotic control plan, including:
obtaining data identifying a current position of a particular robotic component of the plurality of robotic components,
generating, using the obtained data, a safety trajectory for the particular robotic component, and
providing the safety trajectory to an emergency control system;
determining that an emergency condition has occurred; and
in response, transferring control of the particular robotic component from the robotic control system to the emergency control system, comprising halting execution of the original trajectory and causing, by the emergency control system, execution of the safety trajectory generated before the emergency condition occurred by the particular robotic component.

9. The system of claim 8, wherein causing, by the emergency control system, execution of the safety trajectory comprises:
processing the safety trajectory using a linear filter to generate an updated safety trajectory; and
causing, by the emergency control system, execution of the updated safety trajectory.

10. The system of claim 8, wherein the safety trajectory comprises one or more of:
a sequence of waypoint data objects that each represent a pose of the particular robotic component at a different respective time point; or
a spline representing motion of the particular robotic component in the robotic execution environment across time.

11. The system of claim 8, wherein a new safety trajectory is generated for the particular robotic component at regular intervals.

12. The system of claim 8, wherein, during execution of the safety trajectory by the particular robotic component, the emergency control system and the robotic control system are communicatively disconnected.

13. The system of claim 8, wherein generating the safety trajectory for the particular robotic component comprises processing the obtained data using one or more of:
a behavior tree, or
a switch statement.

14. The system of claim 8, wherein:
the safety trajectory represents nonlinear movement of the particular robotic component; and
linear movement executed by the particular robotic component after the emergency condition would cause a collision in the robotic execution environment.

15. One or more non-transitory computer storage media encoded with computer program instructions that when executed by a plurality of computers cause the plurality of computers to perform operations comprising:
causing, by a robotic control system, execution of a robotic control plan by a plurality of robotic components in a robotic execution environment;
generating a safety trajectory at each of a plurality of time points while executing an original trajectory of the robotic control plan, including:
obtaining data identifying a current position of a particular robotic component of the plurality of robotic components,
generating, using the obtained data, a safety trajectory for the particular robotic component, and
providing the safety trajectory to an emergency control system;
determining that an emergency condition has occurred; and
in response, transferring control of the particular robotic component from the robotic control system to the emergency control system, comprising halting execution of the original trajectory and causing, by the emergency control system, execution of the safety trajectory generated before the emergency condition occurred by the particular robotic component.

16. The non-transitory computer storage media of claim 15, wherein causing, by the emergency control system, execution of the safety trajectory comprises:
processing the safety trajectory using a linear filter to generate an updated safety trajectory; and
causing, by the emergency control system, execution of the updated safety trajectory.

17. The non-transitory computer storage media of claim 15, wherein the safety trajectory comprises one or more of:
a sequence of waypoint data objects that each represent a pose of the particular robotic component at a different respective time point; or
a spline representing motion of the particular robotic component in the robotic execution environment across time.

18. The non-transitory computer storage media of claim 15, wherein a new safety trajectory is generated for the particular robotic component at regular intervals.

19. The non-transitory computer storage media of claim 15, wherein, during execution of the safety trajectory by the particular robotic component, the emergency control system and the robotic control system are communicatively disconnected.

20. The non-transitory computer storage media of claim 15, wherein generating the safety trajectory for the particular robotic component comprises processing the obtained data using one or more of:
a behavior tree, or
a switch statement.

* * * * *